(12) United States Patent
Wu et al.

(10) Patent No.: US 12,124,868 B2
(45) Date of Patent: Oct. 22, 2024

(54) DATA CORRELATION USING FILE OBJECT CACHE

(71) Applicant: Rubrik, Inc., Palo Alto, CA (US)

(72) Inventors: Di Wu, Newark, CA (US); Chenyang Zhou, Mountain View, CA (US); Shanthi Kiran Pendyala, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/055,251

(22) Filed: Nov. 14, 2022

(65) Prior Publication Data

US 2023/0078496 A1 Mar. 16, 2023

Related U.S. Application Data

(63) Continuation of application No. 16/527,377, filed on Jul. 31, 2019, now Pat. No. 11,526,371.

(51) Int. Cl.
| | |
|---|---|
| *G06F 9/455* | (2018.01) |
| *G06F 11/14* | (2006.01) |
| *G06F 16/18* | (2019.01) |
| *H04L 9/32* | (2006.01) |

(52) U.S. Cl.
CPC ...... *G06F 9/45558* (2013.01); *G06F 11/1469* (2013.01); *G06F 16/1873* (2019.01); *H04L 9/3234* (2013.01); *G06F 2009/45587* (2013.01)

(58) Field of Classification Search
CPC ............. G06F 9/45558; G06F 11/1469; G06F 16/1873; G06F 2009/45587; G06F 2201/815; G06F 2201/835; G06F 2201/84; G06F 2201/86; G06F 11/1453; G06F 16/1734; G06F 21/554; G06F 21/6218; G06F 2009/45591; H04L 9/3234; H04L 2463/121; H04L 63/108
See application file for complete search history.

(56) References Cited

U.S. PATENT DOCUMENTS

| | | | |
|---|---|---|---|
| 6,134,597 A * | 10/2000 | Rieth | H04L 69/22 709/217 |
| 7,249,225 B1 | 7/2007 | Seidl et al. | |
| 8,504,758 B1 * | 8/2013 | McHugh | G06F 3/0673 711/100 |
| 8,812,651 B1 * | 8/2014 | Eriksen | H04L 45/7459 709/224 |
| 9,213,709 B2 * | 12/2015 | Patiejunas | G06F 16/113 |
| 9,413,825 B2 * | 8/2016 | Oliveira | G06F 16/13 |
| 9,641,640 B2 * | 5/2017 | Flack | G06F 16/00 |
| 10,210,167 B1 * | 2/2019 | Sorenson, III | H04L 67/568 |
| 10,387,367 B2 * | 8/2019 | Talur | G06F 16/182 |
| 10,902,185 B1 * | 1/2021 | Cairns | G06F 40/166 |
| 11,238,152 B2 * | 2/2022 | Wu | G06F 21/552 |
| 11,487,569 B2 * | 11/2022 | Wu | G06F 21/552 |
| 11,526,371 B2 * | 12/2022 | Wu | G06F 21/6218 |
| 2011/0194133 A1 | 8/2011 | Fujisawa | |

(Continued)

OTHER PUBLICATIONS

Feichtinger et al.; "Authorization of Data Access in Distributed Storage Systems", 2005, IEEE, pp. 172-178. (Year: 2005).*

*Primary Examiner* — Matthew Smithers
(74) *Attorney, Agent, or Firm* — Holland & Hart LLP

(57) ABSTRACT

Some examples relate generally to computer architecture software for data classification and information security and, in some more particular aspects, to verifying audit events in a file system.

20 Claims, 10 Drawing Sheets

(56) References Cited

U.S. PATENT DOCUMENTS

| | | | |
|---|---|---|---|
| 2012/0259821 A1* | 10/2012 | Alam | H04L 67/288 |
| | | | 707/E17.005 |
| 2014/0068202 A1 | 3/2014 | Goddard | |
| 2016/0321010 A1 | 11/2016 | Hashimoto | |
| 2018/0081561 A1* | 3/2018 | Todd | G06F 11/1453 |
| 2019/0080078 A1 | 3/2019 | Teal | |
| 2020/0401313 A1* | 12/2020 | Cheru | G06F 3/0614 |

\* cited by examiner

DATA CORRELATION USING FILE OBJECT CACHE

RELATED APPLICATIONS

This application is a continuation of U.S. patent application Ser. No. 16/527,377 filed Jul. 31, 2019, entitled "DATA CORRELATION USING FILE OBJECT CACHE", the disclosure of which is hereby incorporated by reference herein in its entirety.

FIELD

The present disclosure relates generally to computer architecture software for data classification and information security and, in some more particular aspects, to verifying audit events in a file system.

BACKGROUND

The sheer volume and complexity of data that is collected, analyzed and stored is increasing rapidly over time. The computer infrastructure used to handle this data is also becoming more complex, with more processing power and more portability. As a result, data management and storage is becoming increasingly important. Significant aspects of these processes include access to reliable data backup and storage, and fast data recovery in cases of failure. Other aspects include data portability across locations and platforms.

At the same time, unauthorized access to systems and ransomware have become major cyber-security threats in recent times. In this regard, data security regulations such as those mandated in the General Data Protection Regulation 2016/679 (GDPR) place strict notification obligations on data holders. The GDPR is a regulation in EU law relating to data protection and privacy for all individuals within the European Union and the European Economic Area. The regulation also addresses the export of personal data outside the EU and EEA areas, such as into the United States. Under the GDPR regulation, if there is a data breach the data holder is required to notify all affected users very quickly. Thus, the rapid detection of ransomware or unauthorized access to data is critical.

SUMMARY

In an example embodiment, a data management system is provided. The system may comprise: a storage device configured to store a base file associated with a first version of a virtual machine; a second storage device configured to store one or more forward incremental files associated with one or more versions of the virtual machine; and one or more processors in communication with the first storage device and the second storage device, the one or more processors configured to perform operations including: identifying audit events associated with user file accesses in a monitored computer system, the audit events including a create event and a subsequent event, the subsequent event including a read, write, or cleanup event; resolving a pair value including a user ID and remote IP address at the create event; associating the pair value with a file object id for the base file or the one or more forward incremental files; storing the associated file object id and pair value in a map in a file object cache; and retrieving the file object id from the file object cache at the subsequent event.

In some examples, the file object id is used as an authorization or verification key for the subsequent event. In some examples, the one or more processors is further configured to remove the file object id from the map in the file object cache at a cleanup event included in the subsequent event. In some examples, the cleanup event includes a closing or deletion of a file object associated with the file object id. In some examples, the one or more processors is further configured to apply a time stamp to the file object. In some examples, the one or more processors is further configured to remove the file object id and pair value from the map in the file object cache based on the timestamp meeting or exceeding a threshold value.

In some examples, the audit events are associated with user file accesses in a monitored Windows™ computer system. In some examples, the base and incremental files include internal files stored at a backup system, such as backup system by Rubrik, Inc. that may track user backup events. Some examples of a data management system do not track audit events on the base or incremental files but actual files on a user's Windows™ server.

Another example embodiment includes a data management system. Here, an example system may comprise: a first storage device configured to store a base file associated with a first version of a virtual machine; a second storage device configured to store one or more forward incremental files associated with one or more versions of the virtual machine; and a mini-filter including one or more processors in communication with the first storage device and the second storage device, the one or more processors of the mini-filter configured to perform operations including: identifying audit events associated with user file accesses in a monitored computer system, the audit events including a create event and a subsequent event, the subsequent event including a read, write, or cleanup event; resolving a pair value including a user ID and remote IP address at the create event; associating the pair value with a file object id for the base file or the one or more forward incremental files; and storing the associated file object id and pair value in a map in a file object cache. In some examples, a mini-filter includes a kernel mode driver that tracks input-output (IO) operations as users interact with the monitored computer file system.

In some examples, the one or more processors is further configured to: retrieve the file object id from the file object cache at the subsequent event. In some examples, the file object id is used as an authorization or verification key for the subsequent event. In some examples, the one or more processors is further configured to remove the file object id from the map in the file object cache at a cleanup event included in the subsequent event. In some examples, the cleanup event includes a closing or deletion of a file object associated with the file object id. In some examples, the one or more processors is further configured to apply a time stamp to the file object and remove the file object id and pair value from the map in the file object cache based on the timestamp meeting or exceeding a threshold value.

In yet another example embodiment, a data management system is provided. The system may comprise: at least one storage device storing a base file and one or more forward incremental files; a mini-filter including one or more processors in communication with the at least one storage device, the one or more processors configured to perform operations including: identifying audit events associated with user file accesses in a monitored computer system, the audit events including a create event and a subsequent event, the subsequent event including a read, write, or cleanup event; identifying a pair value including a user ID and remote IP address at the create event; associating the pair value with a file object id for the base file or the one or more forward incremental files; storing the associated file object id and pair value in a map in a file object cache in the at least one storage device; and retrieving the file object id from the file object cache at the subsequent event.

In some examples, the file object id is used as an authorization or verification key for the subsequent event. In some examples, the one or more processors is further configured to remove the file object id from the map in the file object cache at a cleanup event included in the subsequent event. In some examples, the cleanup event includes a closing or deletion of a file object associated with the file object id. In some examples, the one or more processors is further configured to apply a time stamp to the file object. In some examples, the one or more processors is further configured to remove the file object id and pair value from the map in the file object cache based on the timestamp meeting or exceeding a threshold value.

DESCRIPTION OF THE DRAWINGS

Some embodiments are illustrated by way of example and not limitation in the figures of the accompanying drawings.

DESCRIPTION

Figure 1:
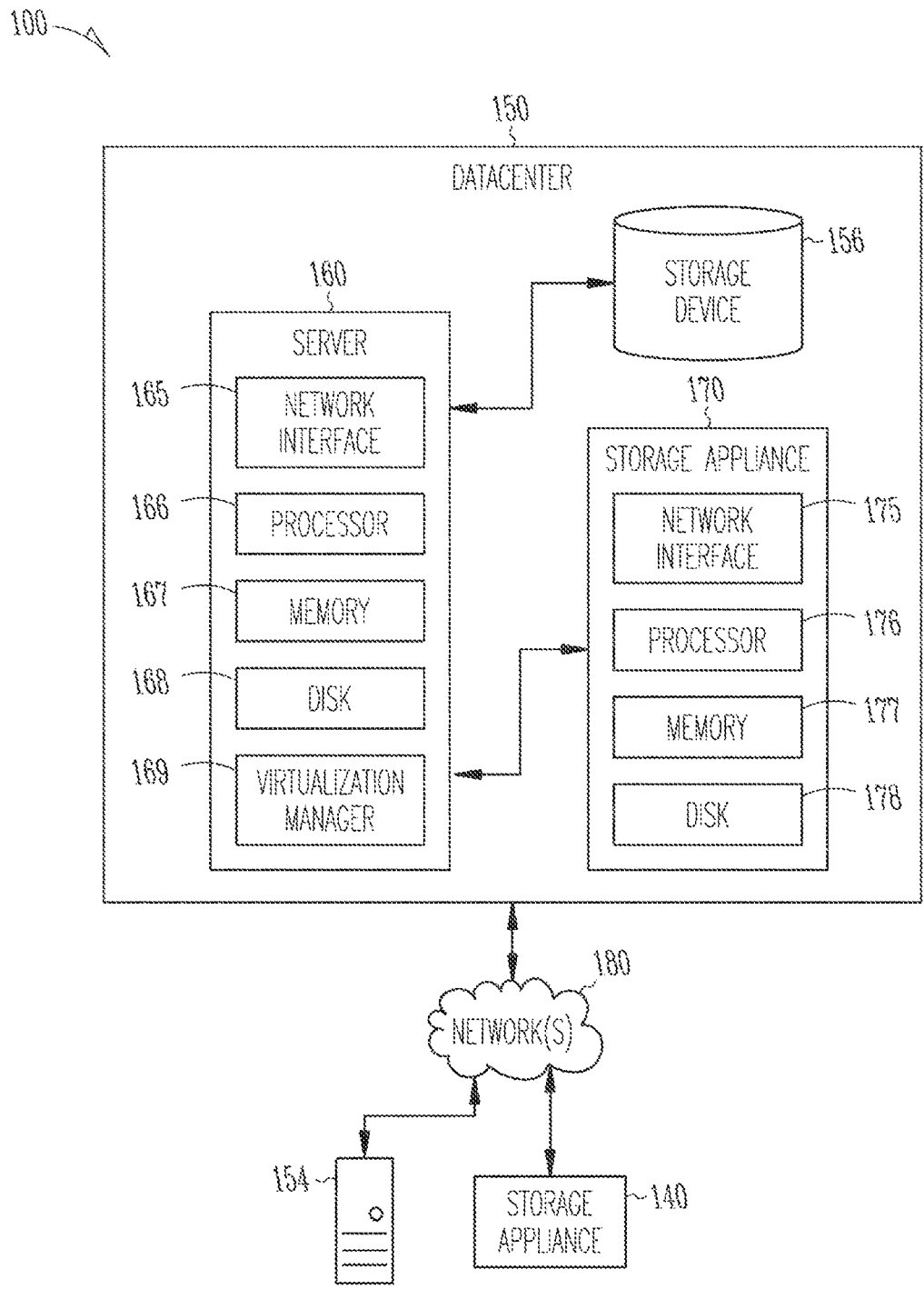
FIG. 1 depicts one embodiment of a networked computing environment 100 in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present invention may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2019, All Rights Reserved.

FIG. 1 depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may also include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 150, may include thousands of servers and/or data storage devices in communication with each other. The one or more data storage devices 156 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server 160 may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine having a virtual disk into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time is frozen) to a storage appliance (for example, a storage appliance 140 or 170 of FIG. 1, described further below) in response to a request made by the storage appliance. After the data associated with the point in time snapshot of the virtual machine has been transferred to the storage appliance 170 (for example), the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of a storage appliance 170 (or 140) includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different points in time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 2:
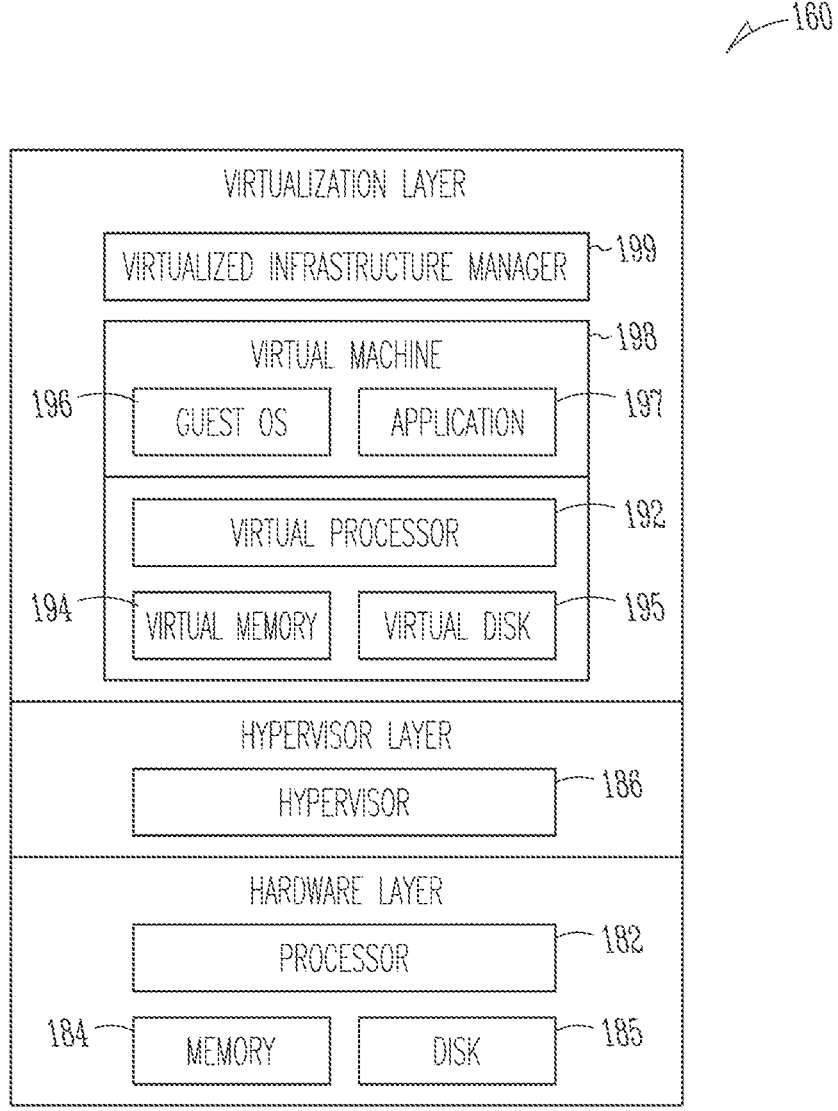
FIG. 2 depicts one embodiment of server 160 in FIG. 1, according to an example embodiment.

FIG. 2 depicts one embodiment of server 160 in FIG. 1. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine 198 may include a plurality of virtual disks 195, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1, may run on a virtual machine or natively on the server 160. The virtual machine may, for example, be or include the virtual machine 198 or a virtual machine separate from the server 160. Other arrangements are possible. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1 or storage appliance 170 in FIG. 1, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance 140 or 170 of FIG. 1 or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1 or storage appliance 170 in FIG. 1, using a distributed file system protocol such as Network File System (NFS) Version 3, or Server Message Block (SMB) protocol. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 3:
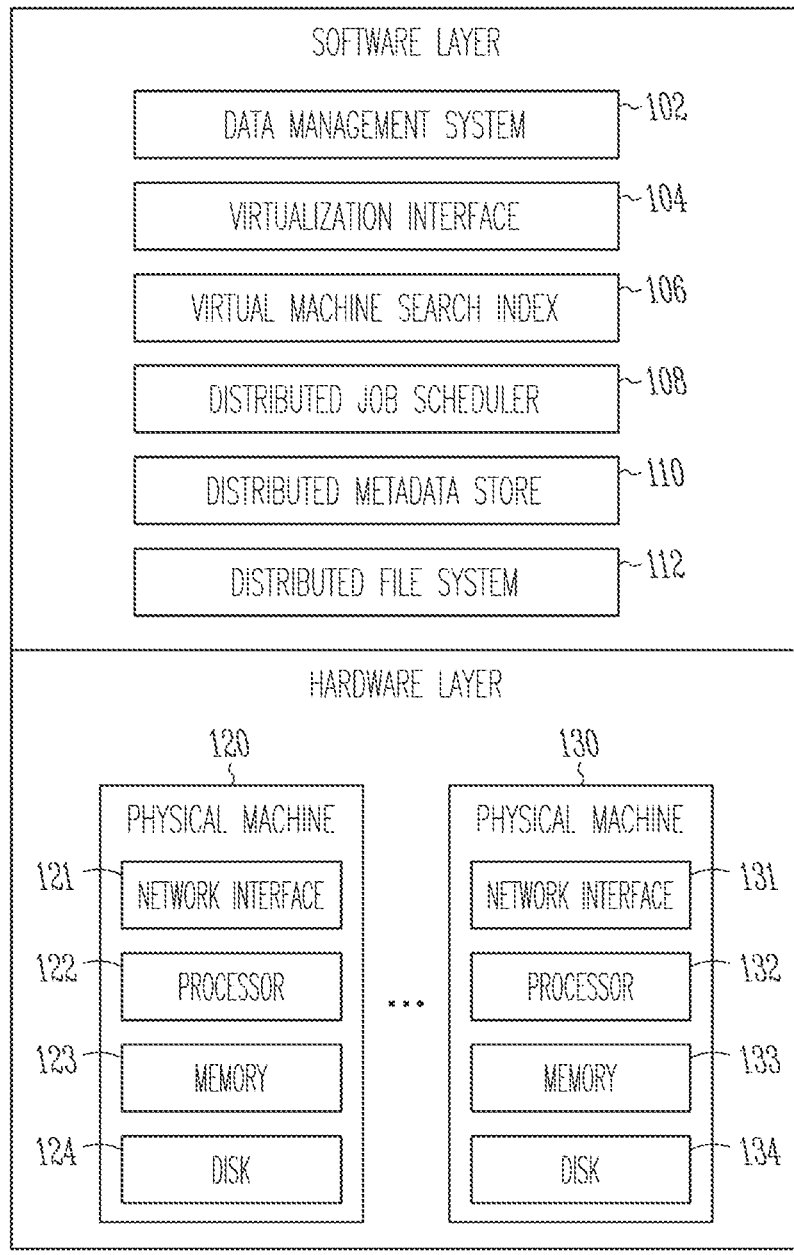
FIG. 3 depicts one embodiment of storage appliance 170 in FIG. 1, according to an example embodiment.

FIG. 3 depicts one embodiment of storage appliance 170 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1, or a hypervisor, such as hypervisor 186 in FIG. 2, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 2 may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 2, to create a frozen copy of the virtual machine and to transfer one or more chunks (or one or more files) associated with the frozen copy to a storage appliance, such as storage appliance 170 in FIG. 1. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 2, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 3.

The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Some examples of the present disclosure identify and capture specific file system data and auditable events (also termed audit events, herein). Such system data and events may be classified and/or filtered to assist in identifying anomalous activity such as unauthorized user access to files in a file system and the infiltration of ransomware therein. In this regard, some example system architectures include a mini-filter and/or a file object cache. In some examples, these two elements operate together in a file system, such as a file system 112 of the type described further above. Other types of file system are possible.

One challenge that may present itself in mini-filter development is that authentication information, such as a security identified (SID) and remote IP, is only correct at a file creation (CREATE) stage. More specifically, if a user tries to read (READ) or modify (e.g. WRITE or CLEANUP) a shared file from a remote machine, he or she will typically be required to provide valid credentials. On a Windows™ host, for example, multiple audit events can occur and be captured including CREATE, READ, WRITE, and CLEANUP audit events. However, a mini-filter can only capture a correct user SID and remote IP address in a CREATE event. Other events merely act as unchecked subsequent system events as authentication has been established or checked previously.

In some examples, a mini-filter includes or acts as a filter manager. A mini-filter may include a kernel-mode driver that conforms to a legacy file system filter model and exposes functionality commonly required in file system filter drivers. A mini-filter driver may include a file system filter that intercepts requests that are targeted at a file system or another file system filter. By intercepting the request before it reaches its intended target, the filter driver can extend or replace functionality provided by the original target of the request.

In order to record actual user information for a complete event series (e.g. CREATE, READ, WRITE, CLEANUP audit events), some examples maintain a map in a file object cache of {file_object_id→(SID, remote IP)}. The file_object_id is a 64-bit unsigned integer that uniquely represents a file object. Although authentication information is only valid or created at a CREATE event, file_object_id remains the same for the rest of the other events.

Figure 4:
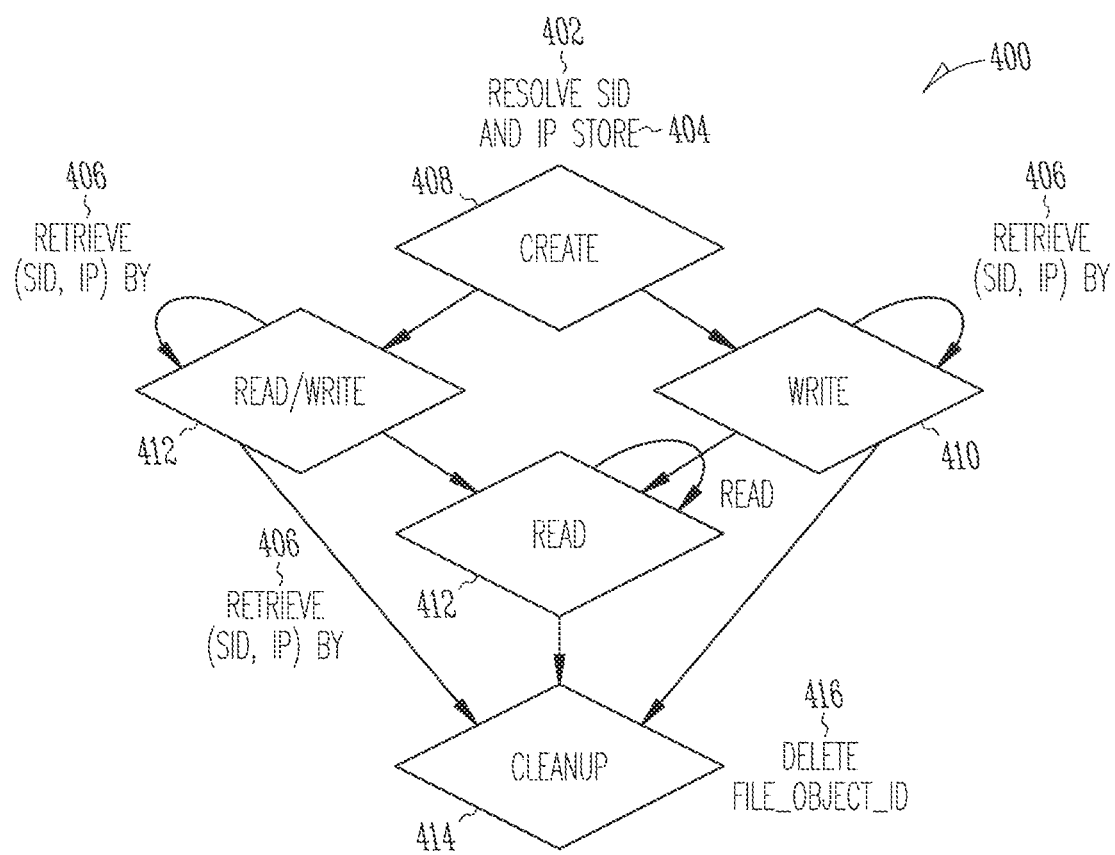
FIG. 4 illustrates example aspects of a file object cache, according to an example embodiment.

Reference is now made to FIG. 4 which illustrates a state map 400 for use in file system data and audit event capture. The state map 400 and associated computer architecture may be included in the data management system 102 or file system 112 described above. As illustrated, in one example, a typical user creating or editing a Word™ document (for example) within the system files or folders may generate many CREATE, WRITE, READ, or CLEANUP audit events, as shown.

Some examples of the present disclosure utilize some or all of these audit events to assist in verifying user activity or identifying anomalous activity such as unauthorized user access to files in a file system, for example. Other use cases are possible. At operation 402 a user SID and remote IP address is resolved or established at a CREATE event 408. At operation 404, the pair {file_object_id→(SID, remote IP address)} is stored to a map in a file object cache. At one or more operations 406 for other events (such as WRITE 410, READ 412, or CLEANUP 414 events), the file_object_id is used as an authorization or verification key and the (user SID, remote IP address) pair is retrieved from the map in the file object cache. Additionally, in some examples, at operation 416 at a CLEANUP event, the file_object_id is removed from the map since a CLEANUP event typically occurs at the end of a complete event series and the corresponding file has already been closed by a kernel, for example. In some examples, in order to ensure that the file object cache remains within a memory size limitation, a timestamp is recorded indicating when a file object was last used. A backend thread (for example, a daemon) may run periodically and remove {file_object_id→(SID, remote IP address)} entries having a timestamp older than a given threshold.

Some examples of the present disclosure identify and capture other specific file system data to assist in identifying anomalous activity such as unauthorized user access to files in a file system.

Figure 5:
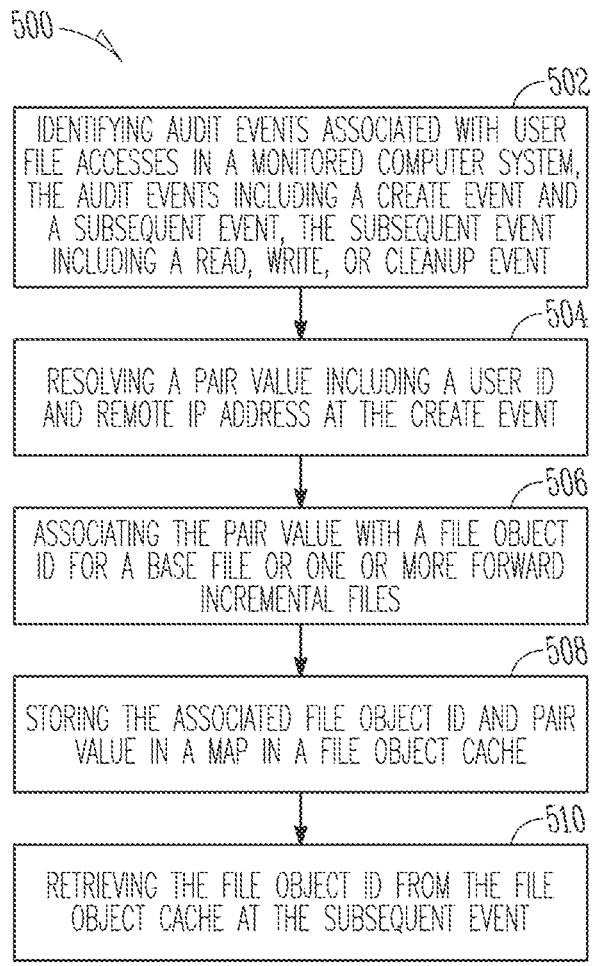
FIGS. 5-7 each depict a block flow chart indicating example operations in a method of the present disclosure, according to an example embodiment.

Some embodiments of the present disclosure include methods. With reference to FIG. 5, an example method 500 by a data management system may include, at operation 502, identifying audit events associated with user file accesses in a monitored computer system, the audit events including a create event and a subsequent event, the subsequent event including a read, write, or cleanup event; at operation 504, resolving a pair value including a user ID and remote IP address at the create event; at operation 506, associating the pair value with a file object id for a base file or one or more forward incremental files; at operation 508, storing the associated file object id and pair value in a map in a file object cache; and, at operation 510, retrieving the file object id from the file object cache at the subsequent event.

In some examples, the file object id is used as an authorization or verification key for the subsequent event. In some examples, the one or more processors is further configured to remove the file object id from the map in the file object cache at a cleanup event included in the subsequent event. In some examples, the cleanup event includes a closing or deletion of a file object associated with the file object id. In some examples, the one or more processors is further configured to apply a time stamp to the file object. In some examples, the one or more processors is further configured to remove the file object id and pair value from the map in the file object cache based on the timestamp meeting or exceeding a threshold value.

Figure 6:
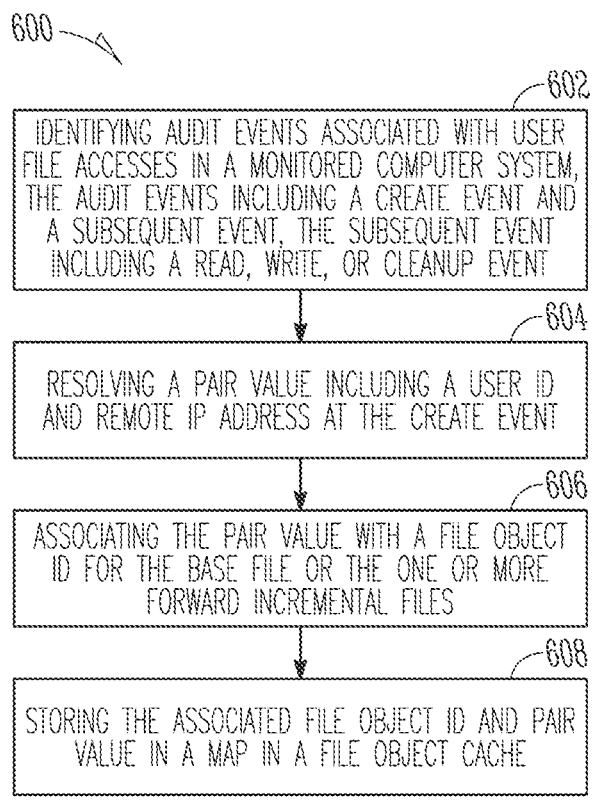

With reference to FIG. 6, an example method 600 by a data management system may include, at operation 602, identifying audit events associated with user file accesses in a monitored computer system, the audit events including a create event and a subsequent event, the subsequent event including a read, write, or cleanup event; at operation 604, resolving a pair value including a user ID and remote IP address at the create event; at operation 606, associating the pair value with a file object id for the base file or the one or more forward incremental files; and, at operation 608, storing the associated file object id and pair value in a map in a file object cache.

In some examples, the one or more processors is further configured to retrieve the file object id from the file object cache at the subsequent event. In some examples, the file object id is used as an authorization or verification key for the subsequent event. In some examples, the one or more processors is further configured to remove the file object id from the map in the file object cache at a cleanup event included in the subsequent event. In some examples, the cleanup event includes a closing or deletion of a file object associated with the file object id. In some examples, the one or more processors is further configured to apply a time stamp to the file object and remove the file object id and pair value from the map in the file object cache based on the timestamp meeting or exceeding a threshold value.

Figure 7:
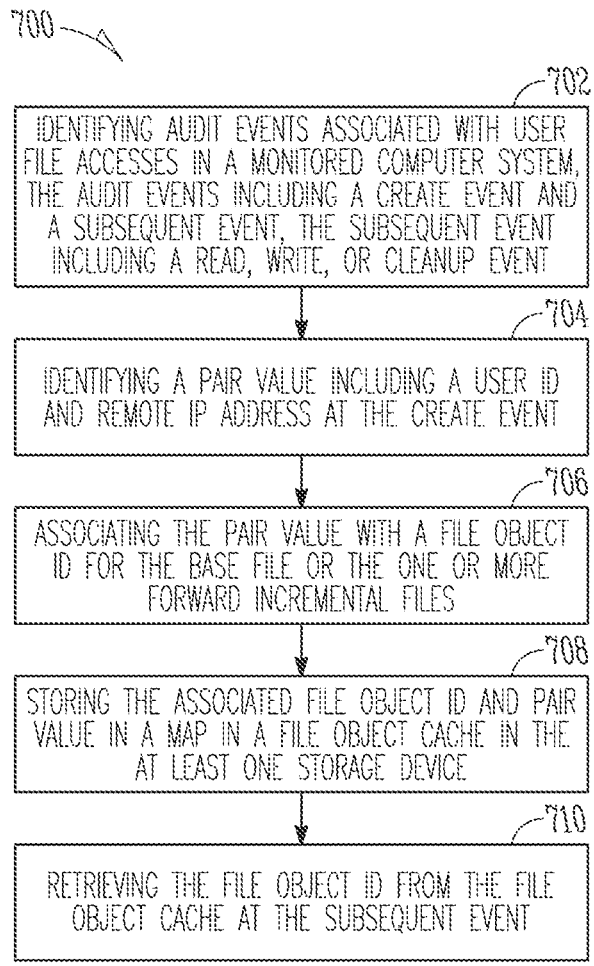

With reference to FIG. 7, an example method 700 by a data management system may include, at operation 702, identifying audit events associated with user file accesses in a monitored computer system, the audit events including a create event and a subsequent event, the subsequent event including a read, write, or cleanup event; at operation 704, identifying a pair value including a user ID and remote IP address at the create event; at operation 706, associating the pair value with a file object id for the base file or the one or more forward incremental files; at operation 708, storing the associated file object id and pair value in a map in a file object cache in the at least one storage device; and, at operation 710, retrieving the file object id from the file object cache at the subsequent event.

In some examples, the file object id is used as an authorization or verification key for the subsequent event. In some examples, the one or more processors is further configured to remove the file object id from the map in the file object cache at a cleanup event included in the subsequent event. In some examples, the cleanup event includes a closing or deletion of a file object associated with the file object id. In some examples, the one or more processors is further configured to apply a time stamp to the file object. In some examples, the one or more processors is further configured to remove the file object id and pair value from the map in the file object cache based on the timestamp meeting or exceeding a threshold value.

Figure 8:
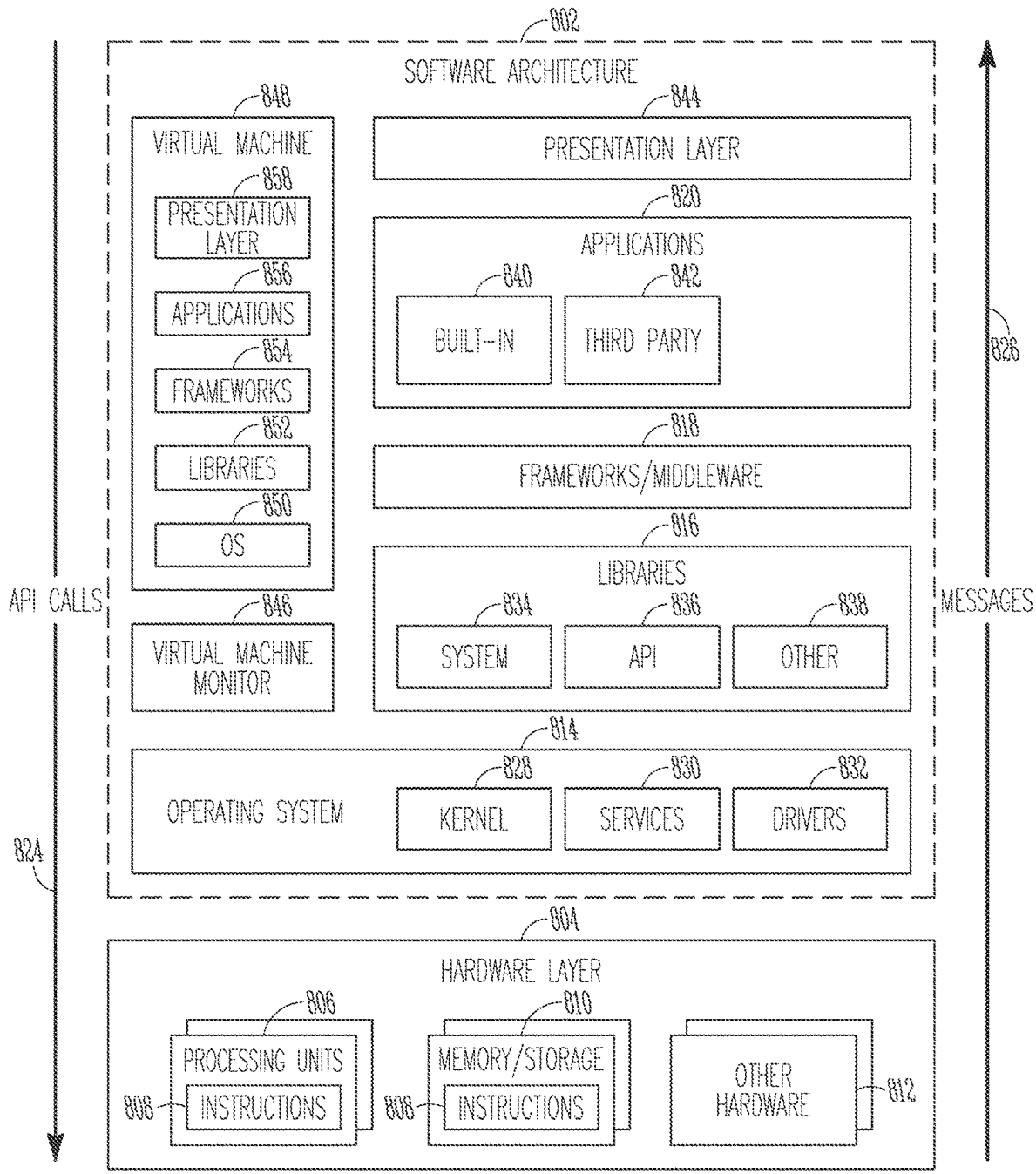
FIG. 8 depicts a block diagram illustrating an example of a software architecture that may be installed on a machine, according to some example embodiments.

FIG. 8 is a block diagram illustrating an example of a computer software architecture for data classification and information security that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 1110, memory 1130, and I/O components 1150. A representative hardware layer 804 of FIG. 8 is illustrated and can represent, for example, the machine 1000 of FIG. 10. The representative hardware layer 804 of FIG. 8 comprises one or more processing units 806 having associated executable instructions 808. The executable instructions 808 represent the executable instructions of the software architecture 802, including implementation of the methods, modules, and so forth described herein. The hardware layer 804 also includes memory or storage modules 810, which also have the executable instructions 808. The hardware layer 804 may also comprise other hardware 810, which represents any other hardware of the hardware layer 804, such as the other hardware illustrated as part of the machine 800.

In the example architecture of FIG. 8, the software architecture 802 may be conceptualized as a stack of layers, where each layer provides particular functionality. For example, the software architecture 802 may include layers such as an operating system 814, libraries 816, frameworks/middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a home application, a contacts application, a browser application, a book reader application, a location application, a media application, a messaging application, or a game application.

The third-party applications 842 may include any of the built-in applications 840, as well as a broad assortment of other applications. In a specific example, the third-party applications 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system 834, APIs 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. A virtual machine creates a software environment where applications/modules can execute as if they were executing on a hardware machine e.g., the machine 1000 of FIG. 10, for example). A virtual machine 848 is hosted by a host operating system (e.g., operating system 814) and typically, although not always, has a virtual machine monitor 846, which manages the operation of the virtual machine 848 as well as the interface with the host operating system (e.g., operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

Figure 9:
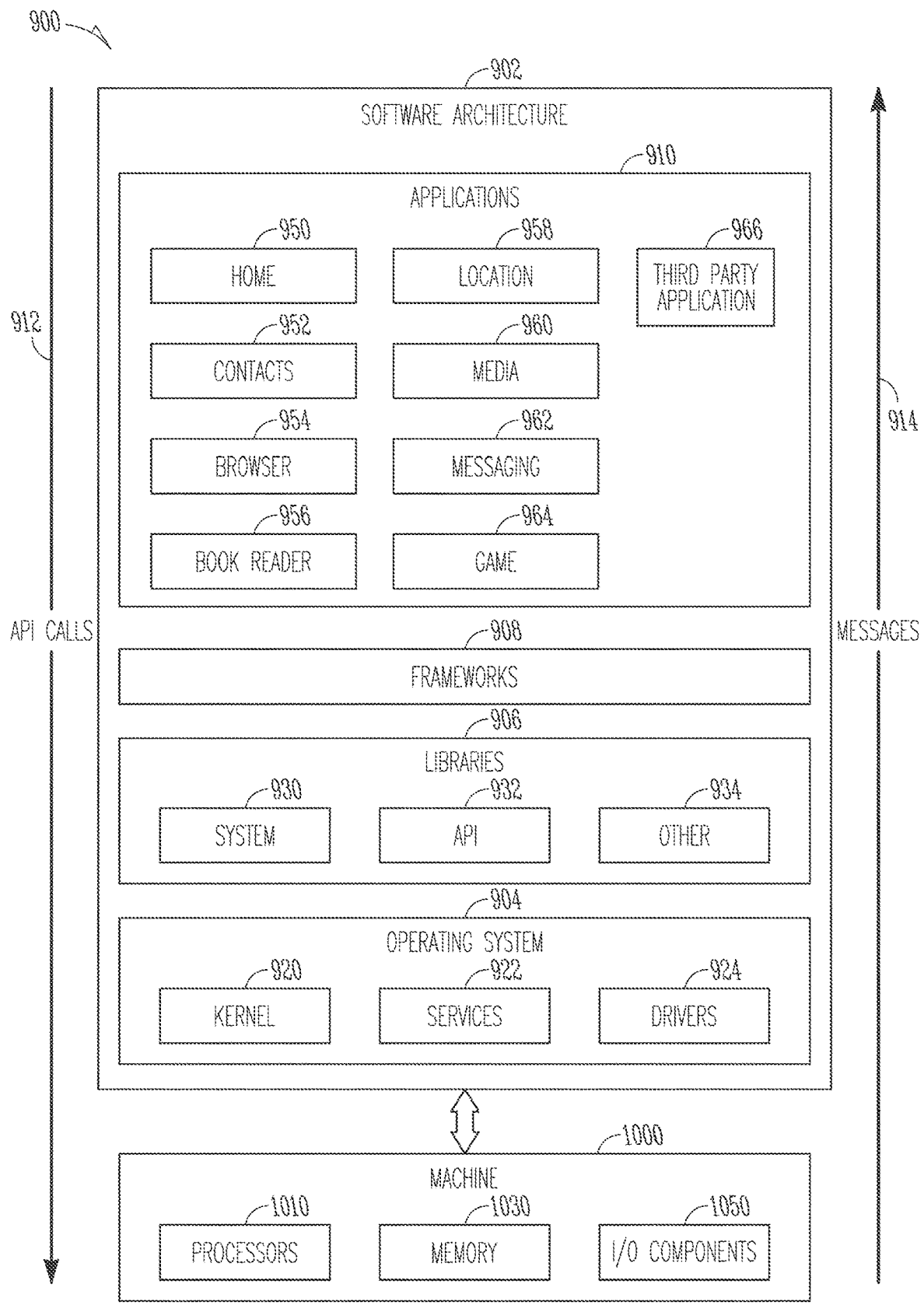
FIG. 9 depicts a block diagram 900 illustrating an architecture of software 902, according to an example embodiment.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 910 provided by the operating system 904 to facilitate functionality described herein.

Figure 10:
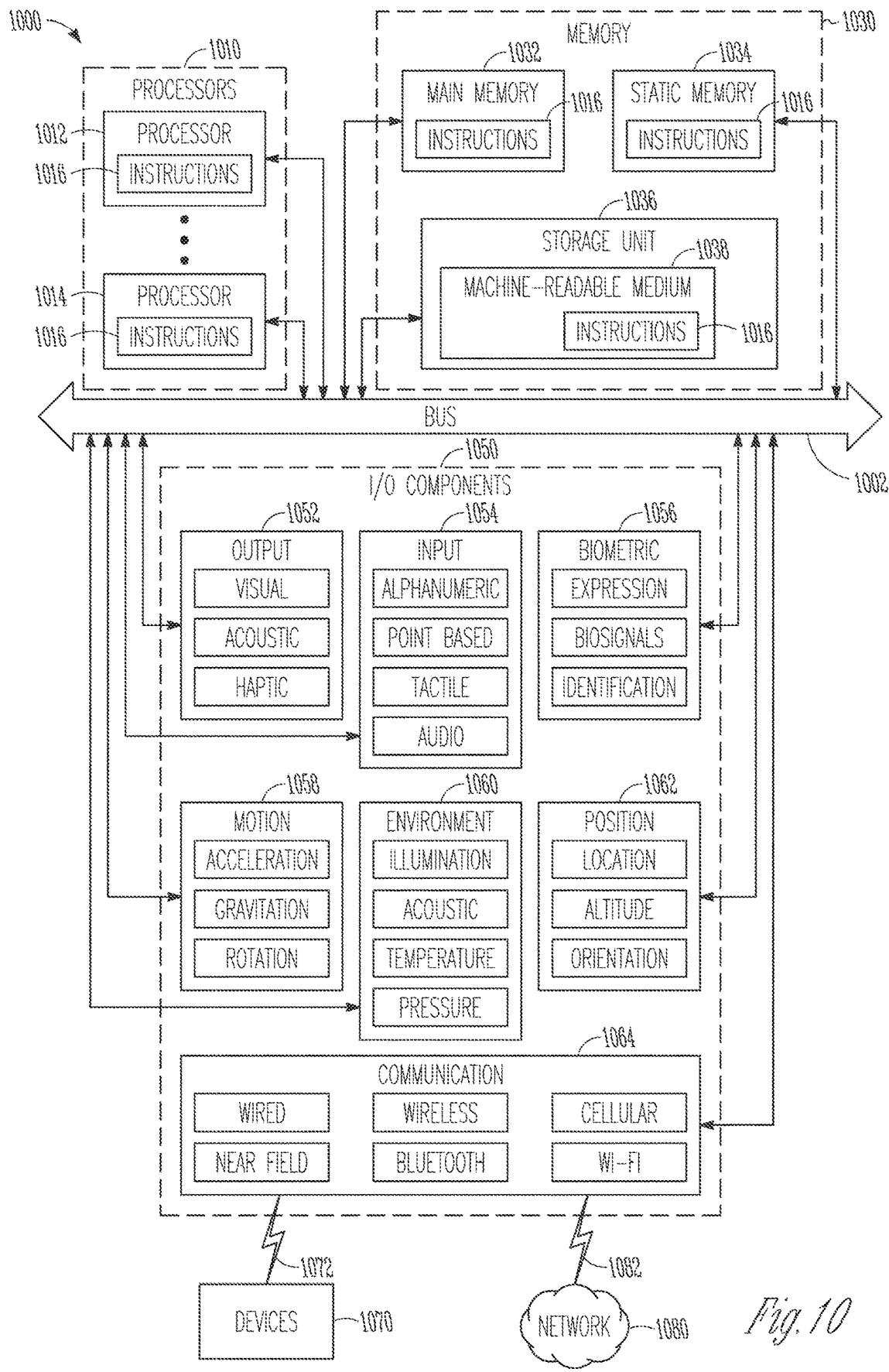
FIG. 10 illustrates a diagrammatic representation of a machine 1000 in the form of a computer system within which a set of instructions may be executed for causing a machine to perform any one or more of the methodologies discussed herein, according to an example embodiment.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. Additionally, or alternatively, the instructions 1016 may implement the operations of the methods shown in FIGS. 5-7, or as elsewhere described herein.

The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, each accessible to the processors 1010 such as via the bus 1002. The main memory 1030, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 1010, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method, comprising:
storing a mapping associated with a unique file object identifier in a file object cache in at least one storage device, wherein the mapping indicates that the unique file object identifier is mapped to a user identifier and a remote internet protocol address associated with a create event for user files in a monitored computer system;
retrieving the mapping associated with the unique file object identifier from the file object cache to authorize one or more access requests to access the user files; and
deleting the mapping associated with the unique file object identifier from the file object cache after performing one or more access operations based at least in part on the one or more access requests.

2. The method of claim 1, wherein deleting the mapping associated with the unique file object identifier from the file object cache comprises:
removing the mapping associated with the unique file object identifier from the file object cache in response to performing a cleanup event for the user files, wherein the one or more access operations comprise at least the cleanup event.

3. The method of claim 2, wherein the cleanup event comprises a closing or deletion of a file object associated with the unique file object identifier.

4. The method of claim 1, further comprising:
applying a timestamp to a file object associated with the unique file object identifier; and
updating the timestamp when the file object is accessed in accordance with the one or more access requests.

5. The method of claim 4, further comprising:
determining that an elapsed time period since a most recent update to the timestamp is greater than a threshold time period, wherein deleting the mapping associated with the unique file object identifier from the file object cache is based at least in part on determining that the elapsed time period is greater than the threshold time period.

6. The method of claim 1, further comprising:
deleting a pair value comprising the user identifier and the remote internet protocol address based at least in part on deleting the mapping associated with the unique file object identifier, wherein deleting the pair value comprises removing the pair value from the file object cache.

7. The method of claim 1, further comprising:
receiving the one or more access requests to access the user files, wherein retrieving the mapping associated with the unique file object identifier from the file object cache is based at least in part on receiving the one or more access requests; and
performing the one or more access operations in response to the one or more access requests, wherein the one or more access operations comprise a read event, a write event, a cleanup event, or any combination thereof associated with the user files.

8. The method of claim 1, further comprising:
authorizing the one or more access requests to the user files based at least in part on retrieving the mapping associated with the unique file object identifier from the file object cache, wherein the unique file object identifier is used as an authorization or verification key for authorizing the one or more access requests.

9. An apparatus, comprising:
at least one storage device;
a processor; and
memory storing instructions that are executable by the processor to cause the apparatus to:
store a mapping associated with a unique file object identifier in a file object cache in the at least one storage device, wherein the mapping indicates that the unique file object identifier is mapped to a user identifier and a remote internet protocol address associated with a create event for user files in a monitored computer system;
retrieve the mapping associated with the unique file object identifier from the file object cache to authorize one or more access requests to access the user files; and
delete the mapping associated with the unique file object identifier from the file object cache after performing one or more access operations based at least in part on the one or more access requests.

10. The apparatus of claim 9, wherein, to delete the mapping associated with the unique file object identifier from the file object cache, the instructions are further executable by the processor to cause the apparatus to:
remove the mapping associated with the unique file object identifier from the file object cache in response to performing a cleanup event for the user files, wherein the one or more access operations comprise at least the cleanup event.

11. The apparatus of claim 10, wherein the cleanup event comprises a closing or deletion of a file object associated with the unique file object identifier.

12. The apparatus of claim 9, wherein the instructions are further executable by the processor to cause the apparatus to:
apply a timestamp to a file object associated with the unique file object identifier; and
update the timestamp when the file object is accessed in accordance with the one or more access requests.

13. The apparatus of claim 12, wherein the instructions are further executable by the processor to cause the apparatus to:
determine that an elapsed time period since a most recent update to the timestamp is greater than a threshold time period, wherein deleting the mapping associated with the unique file object identifier from the file object cache is based at least in part on determining that the elapsed time period is greater than the threshold time period.

14. The apparatus of claim 9, wherein the instructions are further executable by the processor to cause the apparatus to:
delete a pair value comprising the user identifier and the remote internet protocol address based at least in part on deleting the mapping associated with the unique file object identifier, wherein deleting the pair value comprises removing the pair value from the file object cache.

15. The apparatus of claim 9, wherein the instructions are further executable by the processor to cause the apparatus to:
receive the one or more access requests to access the user files, wherein retrieving the mapping associated with the unique file object identifier from the file object cache is based at least in part on receiving the one or more access requests; and
perform the one or more access operations in response to the one or more access requests, wherein the one or more access operations comprise a read event, a write event, a cleanup event, or any combination thereof associated with the user files.

16. The apparatus of claim 9, wherein the instructions are further executable by the processor to cause the apparatus to:
authorize the one or more access requests to the user files based at least in part on retrieving the mapping associated with the unique file object identifier from the file object cache, wherein the unique file object identifier is used as an authorization or verification key for authorizing the one or more access requests.

17. A non-transitory, computer-readable medium that stores instructions that are executable by a processor of an electronic device to cause the electronic device to:
store a mapping associated with a unique file object identifier in a file object cache in at least one storage device, wherein the mapping indicates that the unique file object identifier is mapped to a user identifier and a remote internet protocol address associated with a create event for user files in a monitored computer system;
retrieve the mapping associated with the unique file object identifier from the file object cache to authorize one or more access requests to access the user files; and
delete the mapping associated with the unique file object identifier from the file object cache after performing one or more access operations based at least in part on the one or more access requests.

18. The non-transitory, computer-readable medium of claim 17, wherein, to delete the mapping associated with the unique file object identifier from the file object cache, the instructions are further executable by the processor to cause the electronic device to:
  remove the mapping associated with the unique file object identifier from the file object cache in response to performing a cleanup event for the user files, wherein the one or more access operations comprise at least the cleanup event.

19. The non-transitory, computer-readable medium of claim 17, wherein the instructions are further executable by the processor to cause the electronic device to:
  apply a timestamp to a file object associated with the unique file object identifier; and
  update the timestamp when the file object is accessed in accordance with the one or more access requests.

20. The non-transitory, computer-readable medium of claim 19, wherein the instructions are further executable by the processor to cause the electronic device to:
  determine that an elapsed time period since a most recent update to the timestamp is greater than a threshold time period, wherein deleting the mapping associated with the unique file object identifier from the file object cache is based at least in part on determining that the elapsed time period is greater than the threshold time period.

* * * * *